United States Patent
Uyanik et al.

(10) Patent No.: US 9,120,465 B2
(45) Date of Patent: Sep. 1, 2015

(54) VEHICLE FLUID FILLING ARRANGEMENT, AN ASSEMBLY COMPRISING SUCH A FILLING ARRANGEMENT AND A VEHICLE WITH SUCH A FILLING ARRANGEMENT

(71) Applicant: VOLVO CAR CORPORATION, Gothenburg (SE)

(72) Inventors: Gabriel Uyanik, Gothenburg (SE); Tommy Zippert, Gothenburg (SE); Martin Gottschalk, Lycke (SE); Jan Davidsson, Hisings Karra (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/177,626

(22) Filed: Feb. 11, 2014

(65) Prior Publication Data
US 2014/0230959 A1    Aug. 21, 2014

(30) Foreign Application Priority Data
Feb. 18, 2013   (EP) ..................... 13155602

(51) Int. Cl.
*B60S 1/50* (2006.01)
*B67C 11/02* (2006.01)

(52) U.S. Cl.
CPC .. *B60S 1/50* (2013.01); *B67C 11/02* (2013.01)

(58) Field of Classification Search
CPC ........... B60S 1/50; B67C 11/00; B67C 11/02; B67C 2011/027
USPC ............... 141/18, 114, 313, 331–345, 86–87; 220/666, 86.2, 573; 239/284.1; 296/192, 208, 193.11, 37.5, 38
See application file for complete search history.

(56) References Cited

U.S. PATENT DOCUMENTS

| | | | |
|---|---|---|---|
| 3,938,563 A * | 2/1976 | Gall | 141/298 |
| 5,727,651 A * | 3/1998 | Benedict | 184/1.5 |
| 6,408,693 B1 * | 6/2002 | Drinkwater | 73/323 |
| 6,863,099 B2 * | 3/2005 | Watkins | 141/345 |
| 6,962,381 B2 * | 11/2005 | Warning | 296/1.07 |

(Continued)

FOREIGN PATENT DOCUMENTS

| | | |
|---|---|---|
| DE | 4400383 A1 | 7/1995 |
| DE | 10336847 B4 | 3/2005 |

(Continued)

OTHER PUBLICATIONS

Extended European Search Report Dated Jun. 26, 2013, Application No. 13155602.9-1758, Applicant Volvo Car Corporation, 6 Pages.

*Primary Examiner* — Timothy L Maust
*Assistant Examiner* — Timothy P Kelly
(74) *Attorney, Agent, or Firm* — Brooks Kushman P.C.

(57) ABSTRACT

A vehicle fluid filling arrangement comprises a fluid receiving part and a fluid conveying arrangement adapted to convey a vehicle fluid supplied on the fluid receiving part into a fluid reservoir of a vehicle. The fluid receiving part comprises a fluid receiving surface which is adapted to directly receive the supplied fluid and to direct the fluid to the fluid conveying arrangement, wherein the fluid receiving part has a first retracted position where supply of fluid on the fluid receiving surface is not possible and a second extracted position where supply of fluid on the fluid receiving surface is possible. The disclosure also relates to an assembly for filling vehicle fluid comprising at least two of said fluid filling arrangements and also to a vehicle comprising said fluid filling arrangement.

20 Claims, 5 Drawing Sheets

(56) References Cited

U.S. PATENT DOCUMENTS

| | | | |
|---|---|---|---|
| 7,578,150 B2 * | 8/2009 | Zsambeki | 68/17 R |
| 7,635,013 B2 * | 12/2009 | Ballinger | 141/338 |
| 7,975,734 B2 * | 7/2011 | Makowiec et al. | 141/342 |
| 8,141,184 B2 * | 3/2012 | Mondrush | 4/621 |
| 8,567,457 B2 | 10/2013 | Polewarczyk et al. | 141/338 |
| 2006/0244288 A1 * | 11/2006 | Sandhu et al. | 296/192 |
| 2012/0103467 A1 | 5/2012 | Polewarczyk et al. | |
| 2014/0211494 A1 * | 7/2014 | Duffe | 362/516 |

FOREIGN PATENT DOCUMENTS

| | | |
|---|---|---|
| EP | 1057703 B1 | 11/2004 |
| FR | 2927065 A1 | 8/2009 |
| FR | 2927296 A1 | 8/2009 |

* cited by examiner

VEHICLE FLUID FILLING ARRANGEMENT, AN ASSEMBLY COMPRISING SUCH A FILLING ARRANGEMENT AND A VEHICLE WITH SUCH A FILLING ARRANGEMENT

CROSS-REFERENCE TO RELATED APPLICATIONS

This application claims foreign priority benefits under 35 U.S.C. §119(a)-(d) to European patent application number EP 13155602.9, filed Feb. 18, 2013, which is incorporated by reference in its entirety.

TECHNICAL FIELD

The present disclosure relates generally to a vehicle fluid filling arrangement, an assembly comprising such a filling arrangement and a vehicle with such a filling arrangement.

BACKGROUND

In current systems for refilling of system fluids, for example washer fluid, oil or other fluids, in vehicles, the bonnet normally needs to be raised and a cap of a fluid reservoir has to be removed before it is possible to supply fluid. Thus, the filling process can be both time consuming and dirty. It can also be difficult to hit the filling hole. This can lead to spilling of fluid in the engine room and unnecessary waste of fluid, which can be both expensive and environmentally unfriendly.

Some of the above mentioned problems are for example concerned in patent application EP1057703B1. Here fluid is supplied into a hole located in the plenum chamber cover arranged between the bonnet edge and the window of a vehicle. Thus, filling is possible without opening the bonnet. However, even though the edges of the hole are tapered, the filling area is relatively small and can be difficult to hit. The small hole may also lead to quick overfilling of fluid.

Another solution is presented in DE10336847B4. Here a separate lid is arranged between the bonnet and the wind screen which is covering holes for fluid filling. Thus, filling of fluid is possible without opening the entire bonnet. However, since the volume under the lid is not entirely sealed it is still necessary to cover the fluid filling opening with a cap which needs to be removed before filling. Further, the fluid filling hole is small and is difficult to hit.

With the above solutions in mind it would be advantageous to provide a fluid filling arrangement which is accessible without fully opening the bonnet and which provides an easy and quick filling of a fluid reservoir located in the vehicle.

SUMMARY

An object of the present disclosure is to provide a fluid filling arrangement which is accessible when the bonnet is fully closed and which provides an easy and quick filling of a fluid reservoir located in the vehicle. Another aspect of the disclosure is to provide a vehicle with such a fluid filling arrangement. A further aspect is an assembly comprising several fluid filling arrangements.

Thus, the disclosure relates to a vehicle fluid filling arrangement comprising a fluid receiving part and a fluid conveying arrangement adapted to convey a vehicle fluid supplied on the fluid receiving part into a fluid reservoir of a vehicle. The disclosure is characterized in that the fluid receiving part comprises a fluid receiving surface which is adapted to directly receive the supplied fluid and to direct the fluid to the fluid conveying arrangement and where the fluid receiving part has a first retracted position where supply of fluid on the fluid receiving surface is not possible and a second extracted position where supply of fluid on the fluid receiving surface is possible.

When supplying fluid on a fluid receiving surface having a certain area instead of in a hole with a smaller area the filling can be quicker and less fluid is spilled. Further, using a fluid receiving surface which is hidden in the retracted position, preferably under the vehicle bonnet, during the time interval when the reservoir still contain fluid and no refilling is necessary will also have other advantages. These advantages may be space savings, accessibility, essentially no impact on the vehicle exterior design and a fluid receiving surface kept free of debris and dirt.

In another embodiment the fluid receiving part comprises at least a first and a second fluid conveying protrusion extending from the fluid receiving surface in a direction essentially perpendicular to the surface.

The protrusions act as a stop for the fluid in a direction transversal to the flow. Thus the fluid is conveyed directly into the fluid conveying arrangement and spilling of fluid is prevented.

In another embodiment the fluid receiving part comprises a closure part extending from the fluid receiving surface in a direction essentially perpendicular to the surface.

The closure part is arranged by or near the wind screen facing edge of the fluid receiving surface. When the fluid receiving part is in its first retracted position the closure part is used to close off an opening between the surroundings and an inner volume of the fluid conveying arrangement. Thus, the fluid passage to the reservoir is sealed from surroundings.

In another embodiment the fluid receiving part is adapted to be moved manually or automatically between the first and the second position.

In another embodiment the closure part is arranged to be used to manually move the fluid receiving part between the first and second position.

A manual opening of the fluid filling arrangement, for example by gripping the closure part or a handle arranged in the closure part, is a convenient an simple yet effective operation. However, it is also possible to automatically extend the fluid receiving surface by for example pushing a button inside the vehicle.

In another embodiment the fluid receiving part is slidingly arranged in the fluid conveying arrangement.

A reliable and cost effective design of the fluid receiving part is to use a plate sliding back and forth in an enclosed volume in the fluid conveying arrangement. Thus, the fluid receiving part operates as a drawer slidingly arranged in a housing of the fluid conveying arrangement.

In another embodiment the fluid receiving part is attached to and extendable from the fluid conveying arrangement.

It is also possible to use a fluid receiving part with a extendable surface (elastic, telescopic, overlapping or foldable) which is extendable from a folded position in a direction essentially straight from the fluid conveying arrangement, i.e., parallel to the fluid flow direction, or extendable by a pivoting movement of the part around a pivot point attached to the fluid conveying arrangement. Such a design of the fluid receiving part may be space saving and does not require a housing with an elongated inner volume.

In another embodiment the fluid filling arrangement is least partly arranged under a bonnet of the vehicle and is accessible when the bonnet is fully closed.

Arranging the fluid filling arrangement at least partly under the bonnet is a placement easily accessible by the driver and if it is accessible when the bonnet is closed the filling process becomes quicker and less dirty.

In another embodiment the fluid receiving part is lockable in its first retracted position by an electronic or mechanical locking device (for example wind screen wipers or other).

A locking device may be used to prevent unauthorized persons from filling unidentified fluid into the fluid reservoir. The lock may be an electronic or mechanical lock. It is for example possible to use the wind screen wipers as a stop for the fluid receiving part.

In another embodiment the filling arrangement also comprises an illumination device.

It may be dark when fluid need to be filled. Arranging an illumination device such as any kind of light on or near the filling arrangement is therefore a desirable feature. Preferably, the light should illuminate the fluid receiving surface and the light source may be arranged on any part of the filling arrangement.

In another embodiment the filling arrangement also comprises fluid level control arrangement.

During refilling it might be difficult to notice when the fluid reservoir is full or nearly full. Another desirable feature is therefore a fluid level control arrangement of any kind. For example it is possible to make the housing or other parts of the filling arrangement transparent or to use a strip of transparent material having fluid level markings.

In another embodiment the filling arrangement also comprises a heating arrangement arranged to prevent the arrangement from freezing.

During cold weather water or other fluid present in or around the fluid filling arrangement may freeze and block the freedom of movement of the fluid receiving part. It is therefore possible to arrange heating in or on the parts most likely to freeze, for example the edges of the fluid receiving part.

Another aspect of the disclosure relates to an assembly for filling vehicle fluid comprising at least two of the fluid filling arrangements according to any of the above claims.

When using two fluid filling arrangements in parallel it is possible to refill more than one fluid reservoir with same or different fluids. The at least two fluid filling arrangements are preferably placed in vicinity of each other near the wind screen of the vehicle.

Yet another aspect of the disclosure relates to a vehicle comprising at least one arrangement for filling vehicle fluid as described above, wherein the fluid filling arrangement is least partly arranged under the vehicle bonnet and is accessible when the bonnet is fully closed.

A filling arrangement arranged in the space between the vehicle bonnet and the plenum chamber cover is easily accessible for the person which is about to refill the fluid reservoir. It is also possible to refill a fluid reservoir without opening the bonnet.

In another embodiment of the vehicle, the arrangement is attached to the plenum chamber cover or to any other structural part of the vehicle at least partly covered by the bonnet and wherein said second position is a position where the fluid receiving part is arranged partly covering the windscreen of the vehicle.

By placing the arrangement on or near the plenum chamber cover, a relatively unused volume under the bonnet is used. Having the fluid receiving part to extend over the wind screen is also a for the driver intuitive location of a fluid filling arrangement, especially if the fluid to be filled is washer fluid. Thus, the driver can easily locate where fluid is to be filled.

BRIEF DESCRIPTION OF THE DRAWINGS

Embodiments according to the disclosure will now be described, by way of example, with reference to the accompanying drawings, in which.

DETAILED DESCRIPTION

In the following, a detailed description of different embodiments of the disclosure is provided with reference to the accompanying drawings. All examples herein should be seen as part of the general description and are therefore possible to combine in any way in general terms. Again, individual features of the various embodiments and methods may be combined or exchanged unless such combination or exchange is clearly contradictory to the overall function of the fluid filling arrangement.

Briefly described, the disclosure relates to a vehicle fluid filling arrangement for a vehicle. Said vehicle fluid may be washer fluid, coolant, oil, urea or other vehicle related fluid. The fluid filling arrangement is located at least partly under the bonnet of the vehicle and is accessible when the bonnet is fully closed. The fluid filling arrangement comprises an extractable fluid receiving part with a fluid receiving surface on which the fluid is to be supplied. The extractable surface is moveable from a first retracted position where filling is impossible to a second extracted position where filling is possible. Three different embodiments of the fluid receiving surface are shown in FIGS. 3, 4 and 5 respectively.

Figure 1:
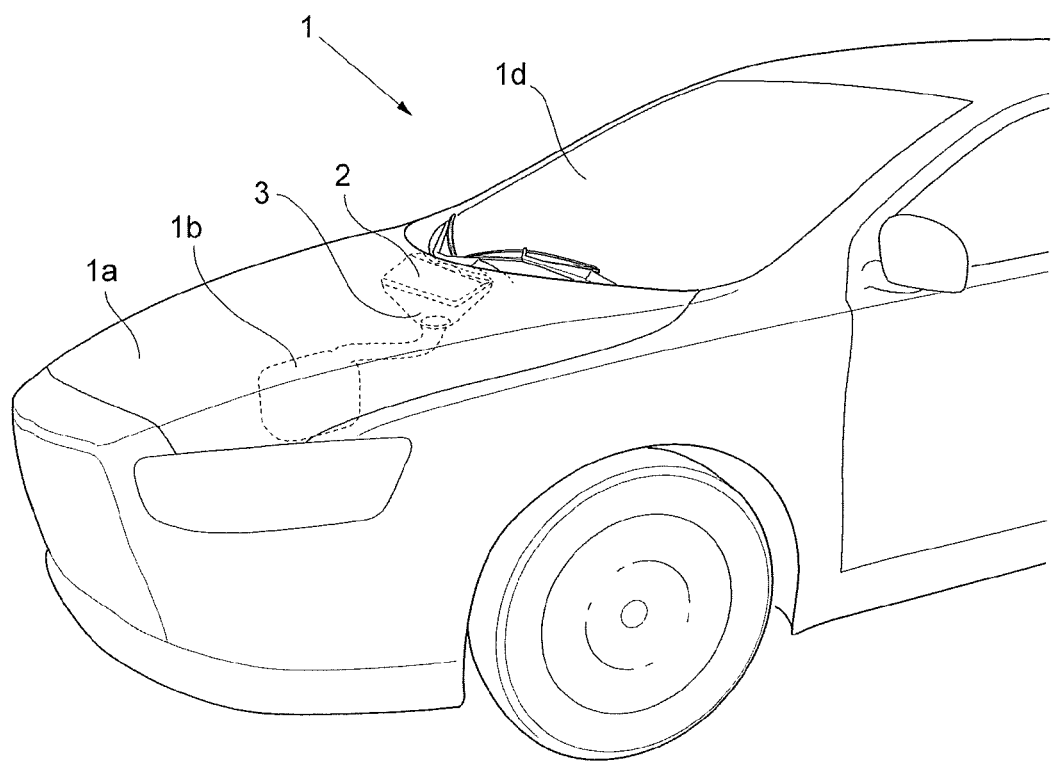
FIG. 1 discloses a first embodiment according to the disclosure mounted in a vehicle.

In FIG. 1 a first embodiment of the disclosure is shown mounted in a vehicle 1. The fluid filling arrangement 2 is located under the vehicle bonnet 1a near the wind screen 1d and comprises a fluid receiving part 2a (see FIG. 2) and a fluid conveying arrangement 3. The fluid conveying arrangement 3 is adapted to convey a vehicle fluid supplied on the fluid receiving part 2a into a fluid reservoir 1b of the vehicle 1. The fluid reservoir 1b is located at an appropriate place in the vehicle, for example somewhere in the engine room, and may be any type of reservoir for any type of vehicle related fluid.

Figure 2A:
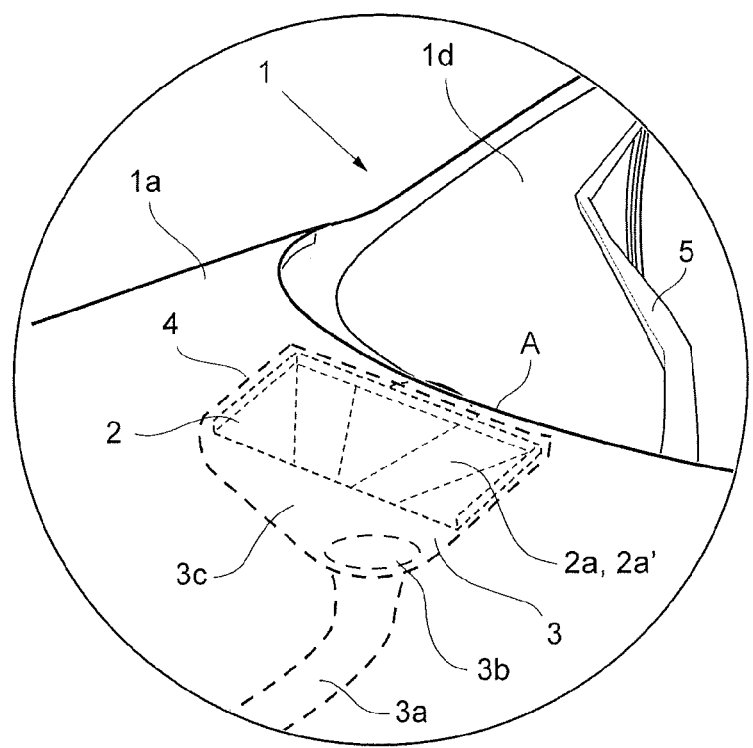
FIGS. 2a and 2b disclose views of the first embodiment of the fluid filling arrangement in its first and second positions.
Figure 2B:
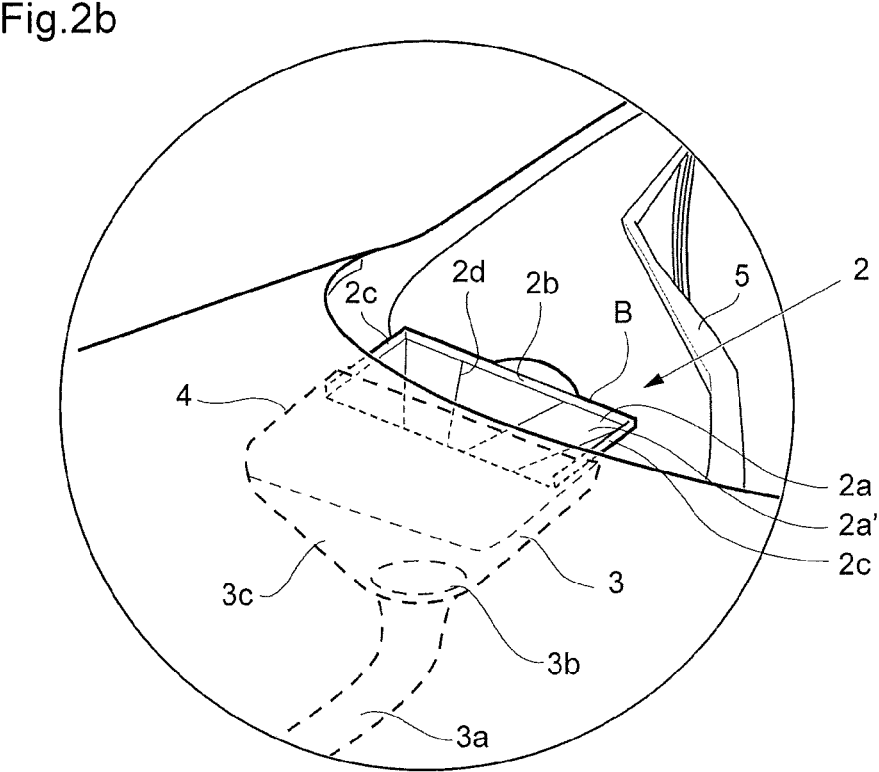

A first embodiment of the fluid filling arrangement is disclosed in FIGS. 2a and 2b. In FIG. 2a the arrangement is shown with the fluid receiving part 2a in a first retracted position A, and in FIG. 2b the arrangement is shown in a second extracted position B. In said first position A the fluid receiving part 2a is arranged hidden under the bonnet 1a and in said second position B the fluid receiving part 2a is partly covering the windscreen 1d of the vehicle.

The fluid filling arrangement 2 comprises a fluid receiving part 2a with a fluid receiving surface 2a'. The fluid receiving surface 2a' is adapted to directly receive the supplied fluid and to direct the fluid to the fluid conveying arrangement 3. The fluid filling arrangement 2 is in this embodiment attached to the plenum chamber cover. However, it is also possible to attach it to any other structural part of the vehicle at least partly covered by the bonnet 1a.

When the fluid receiving part 2a is in its second extracted position B, the surface 2a' is essentially parallel to the extension of the bonnet 1a, i.e., essentially horizontal. However, it is also possible to angle the fluid receiving part 2a or the fluid receiving surface 2a' up to 45° from the horizontal plane in order to adapt it to the windscreen angle and to increase the surface area available for direct fluid supply.

In order to be able to quickly collect and convey the fluid from the fluid receiving surface 2a', the area of the surface 2a' is preferably at least 15 cm², more preferably at least 25 cm².

The fluid conveying arrangement 3 comprises a pipe 3a leading to the reservoir 1b with an inlet 3b. The pipe 3a may have a spiral shape, see FIG. 3b. When a spiral shape is used the fluid flow rate can be increased and the filling process quickened up. It may also comprise a fluid collecting enclosed volume 3c which can be used to buffer the fluid before further transport to the reservoir 1b. The fluid conveying arrangement may also include a housing 4 essentially enclosing the inlet 3a and creating said fluid collecting enclosed volume 3c. See a more detailed view of the housing 4 in FIGS. 3a and 3b.

The fluid receiving part 2a comprises at least first and second fluid conveying protrusions 2c extending from the fluid receiving surface 2a'. The protrusions 2c may be arranged at the edges of the fluid receiving surface 2a' acting as side walls leading fluid into the fluid conveying arrangement 3. It is also possible to arrange fluid conducting ridges or groves 2d in the surface 2a' further conveying the fluid into the fluid reservoir 1b.

A closure part 2b protrudes from the fluid receiving surface 1a' in a direction essentially perpendicular to the fluid receiving surface 2a'. When the fluid receiving part 2a is in its first refracted position A, this part 2b is used to close off the fluid passage to the reservoir 1b and to prevent debris and dirt from contaminating the fluid receiving surface 2a' and thereby also the vehicle fluid supplied to the reservoir 1b.

The closure part 2b can also be used to move the fluid receiving part 2a between the first A and second B positions. In the embodiment shown in FIGS. 1-3 and 5, the closure part 2b extends between the first and second fluid conveying protrusions 2c.

Figure 3A:
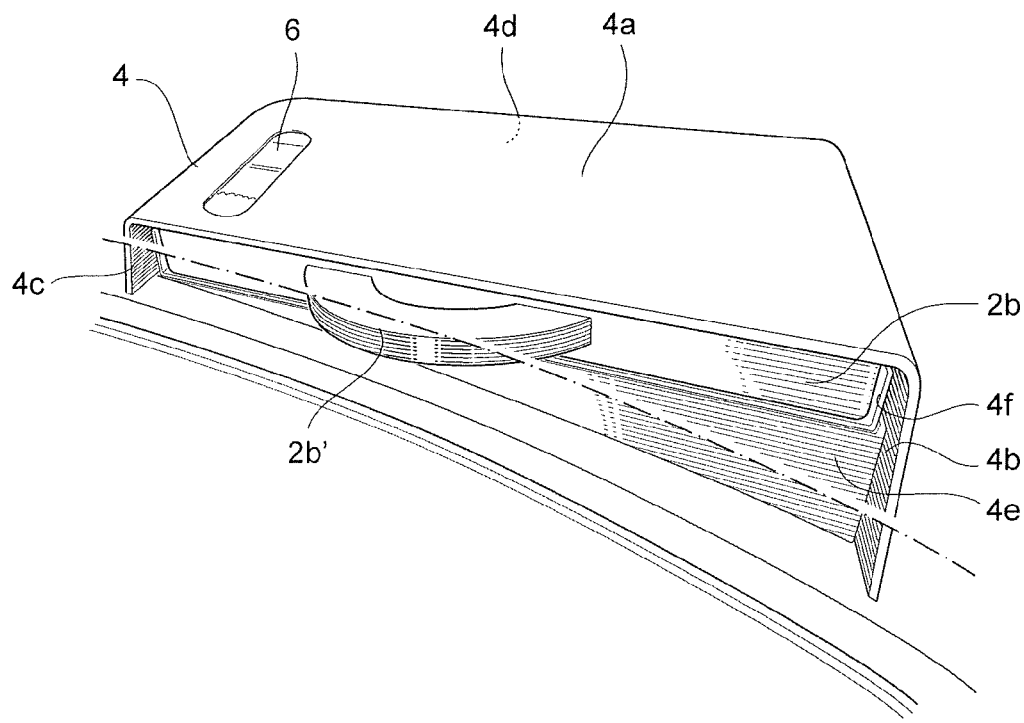
FIGS. 3a and 3b disclose first and second detail views of the first embodiment.
Figure 3B:
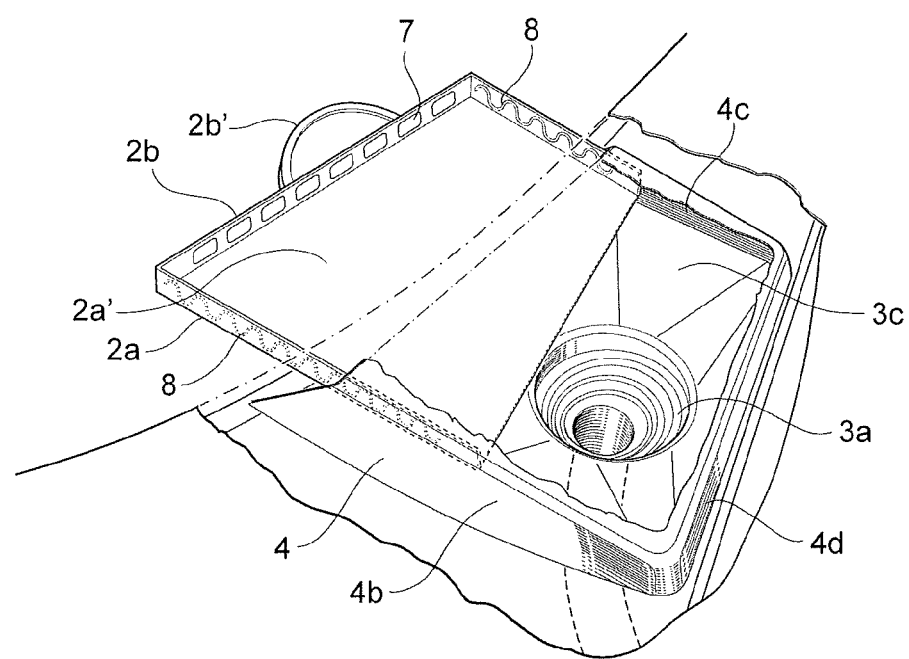

In the detail view, shown in FIGS. 3a and 3b, of the first embodiment, the extractable fluid receiving part 2a is slidingly arranged in the enclosed volume 3c in the housing 4, which is a part of the fluid conveying arrangement 3. The housing 4 may be attached to the plenum chamber cover of the vehicle or to any other structural part of the vehicle at least partly covered by the bonnet 1a. The housing 4 comprises a top wall 4a and side walls 4b-4e and has an opening 4f towards the windscreen 1d of the vehicle in which the fluid receiving part 2a is slidingly arranged.

The fluid receiving part 2a is moveable from the first retracted position A, where filling is impossible, to the second extracted position B, where filling is possible. When in the first position A the fluid receiving part 2a is inserted within the housing 4 and the fluid receiving surface 2a' is laying closed off from the surroundings by the closure part 2b, and when in the second position B the fluid receiving surface 2a' is laying open to the surroundings.

A separate handle 2b' protrudes from the closure part 2b. Alternatively, the handle 2b' may be excluded and the closure part 2b itself may be used as a gripping part or may be pushed open. It is also possible to use an electronic automatic opening device to move the fluid receiving part 2a between the first A and the second B positions. However, the invention is not limited in this respect.

In the embodiment according to FIGS. 1, 2 and 3, the fluid receiving part 2a is an essentially flat plate with a windscreen facing edge having a shape essentially following the edge of the bonnet 1a. Of course other shapes of the fluid receiving part 2a are also possible. It is for example possible to use a fluid receiving part 2a or surface 2a' with a v-shape or u-shape which better convey the fluid into the fluid conveying arrangement 3. The shape of the opening 4f and/or the closure part 2b then has to be adapted to this shape. It is also possible to use a collapsible or telescopic surface 2a', which in its first retracted position A is compressed into a folded state and in its second extended position B is stretched into an unfolded state. Thus, the fluid receiving surface 2a' may comprise several separate parts arranged to overlap and telescopically move relative each other, one extendable harmonica shaped surface or one elastic piece of material possible to stretch, as is further disclosed in FIGS. 4 and 5.

The fluid filling arrangement 2 may be locked in its first position A by a locking device 5. The locking device 5 may be manually activated by the driver from within or outside the vehicle, for example when pushing a specific button. It is also possible to use an automatic lock. The locking device 5 may comprise an electronic or mechanical lock. In one possible embodiment, shown in FIGS. 1, 2a and 2b, the wind screen wipers can be used to securely hold the fluid receiving part 2a in its first position. Other locking devices are of course also possible, for example electromagnetic locks or other mechanical locks.

The fluid receiving surface 2a' is in this embodiment arranged at a certain vertical distance from the bottom of the housing 4. Thus, the fluid collecting enclosed volume 3a of the fluid conveying arrangement 3 is created essentially below the fluid receiving surface 2a'. This volume 3a may be used as part of the fluid reservoir 1b or may be used as an extra reservoir which may prevent overfilling of the arrangement.

In order to better visualize the degree of filling of the fluid reservoir 1b it is possible to use a fluid level control arrangement 6. This fluid level control arrangement 6 may include a fully or partly transparent housing 4 so that the fluid level in the housing 4 can be monitored during filling. When the fluid reservoir is full the fluid level in the housing 4 is increasing quickly, and when that quick increase is noticed, the person filling fluid can stop the filling without risking overfilling and unnecessary waste of fluid.

In the embodiment of FIG. 3b it is also disclosed an illumination device 7 arranged to enlighten the filling arrangement 2. The illumination device 7 may be a fitting comprising one or several lights, such as for example LED. The illumination device 7 may be arranged on or near the housing 4 or on the fluid receiving part 2a, and may be automatically turned on when the filling arrangement 2 is unlocked or when the fluid receiving part 2a is moved.

The filling arrangement 2 may also be provided with a heating arrangement 8, such as for example a heating wire attached to the housing or fluid receiving part 2a. Preferably, the heating wire is arranged near the edges of the arrangement closest to the surroundings. This will prevent freezing of the fluid itself and of the fluid receiving part 2a to the housing 4.

The fluid receiving part 2a may also be removable from the housing 4 in order to be able to remove dirt and debris.

Two other embodiment of the fluid receiving surface 2a' of the fluid filling arrangement 2 are disclosed in FIGS. 4a-b and 5a-b. Here the fluid receiving part 2a comprises a fluid receiving extendable surface 2a' attached to and extendable from the fluid conveying arrangement 3.

Figure 4A:
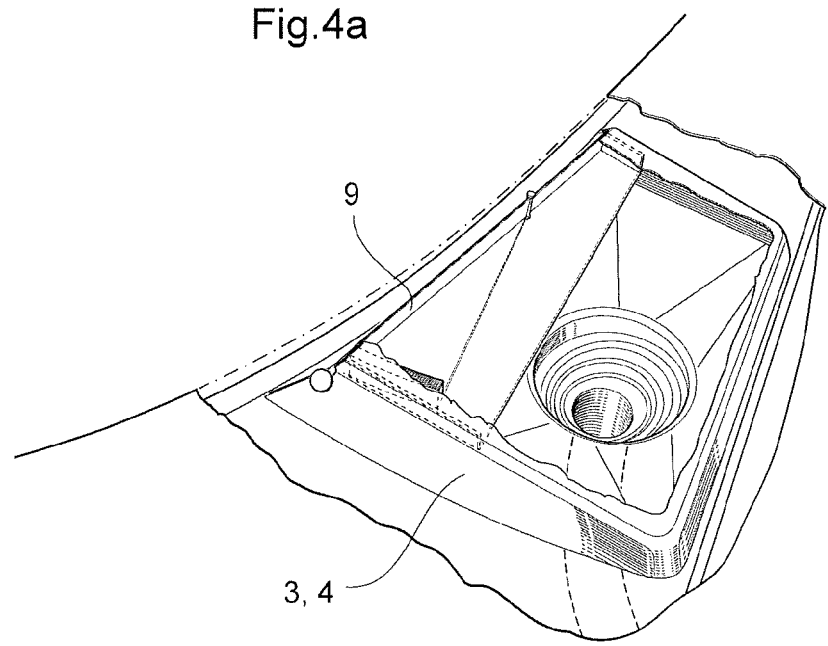
FIGS. 4a and 4b disclose views of a second embodiment in its first and second positions.
Figure 4B:
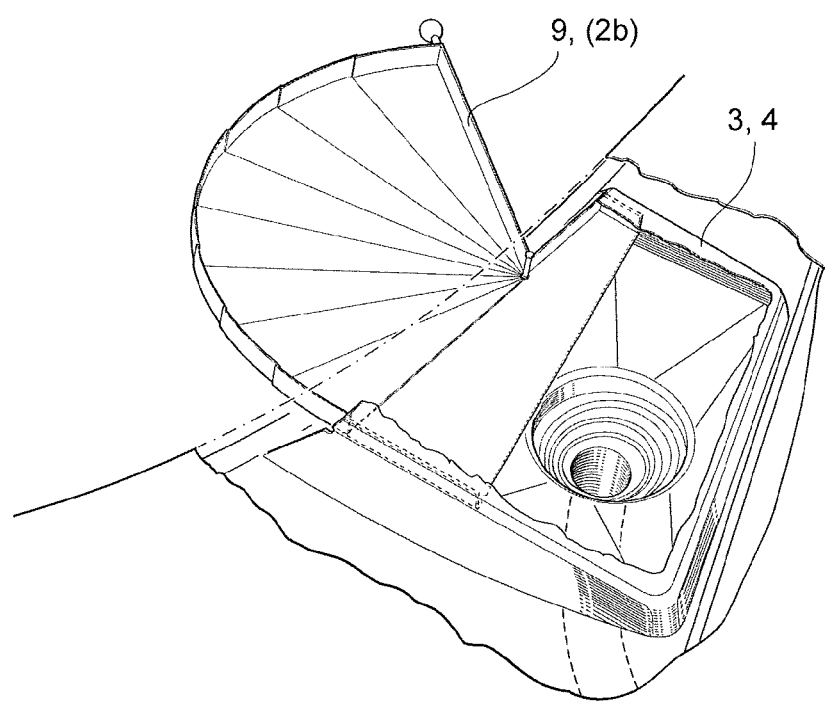

In FIGS. 4a and 4b the fluid receiving part 2a with surface 2a' is attached to a pivotable part 9. Said pivotable part 9 can be compared with the closure part 2b. The fluid receiving surface 2a' may comprise several separate parts arranged to overlap and telescopically move relative each other or one elastic piece of material possible to stretch. The pivotable part 9 pivots around one of its ends, unfolding the fluid receiving surface 2a' as a fan. The ends around which the pivotable part 9 pivot may be attached to a part of the fluid conducting arrangement 3 or to any other part of the vehicle 1. When the arrangement 2 is in its first retracted position A the pivotable part 9 (closure part) is covering the fluid conveying arrangement 3 which leads to the fluid reservoir 1b. Thus, the fluid reservoir 1b, the fluid receiving surface 2a' and the fluid conveying arrangement 3 are closed off from the surroundings. When the arrangement 2 is in its second extended position B, it receives a fan shape and acts as a flat and open funnel conveying the fluid to the fluid reservoir 1b.

Figure 5A:
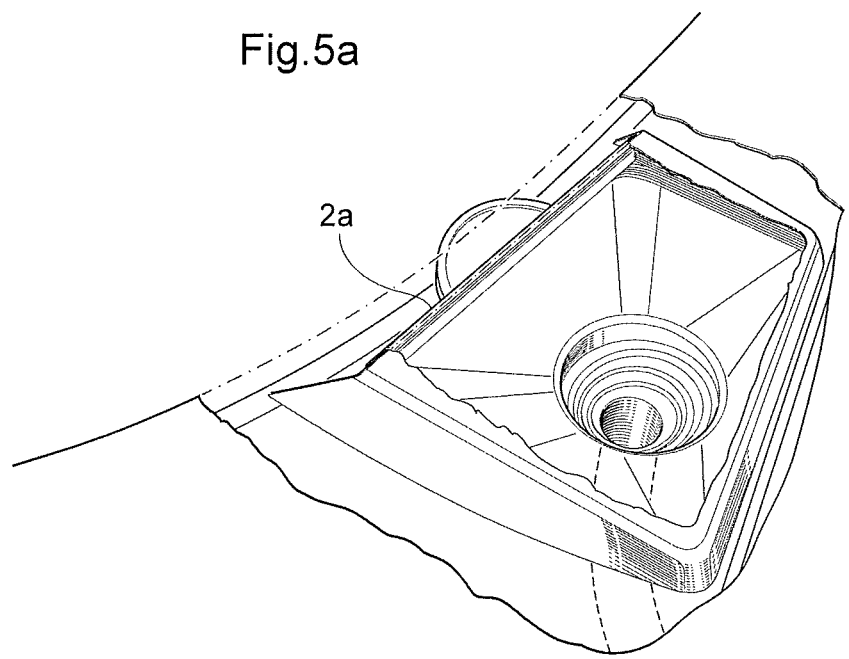
FIGS. 5a and 5b disclose a view of a third embodiment in its first and second positions.
Figure 5B:
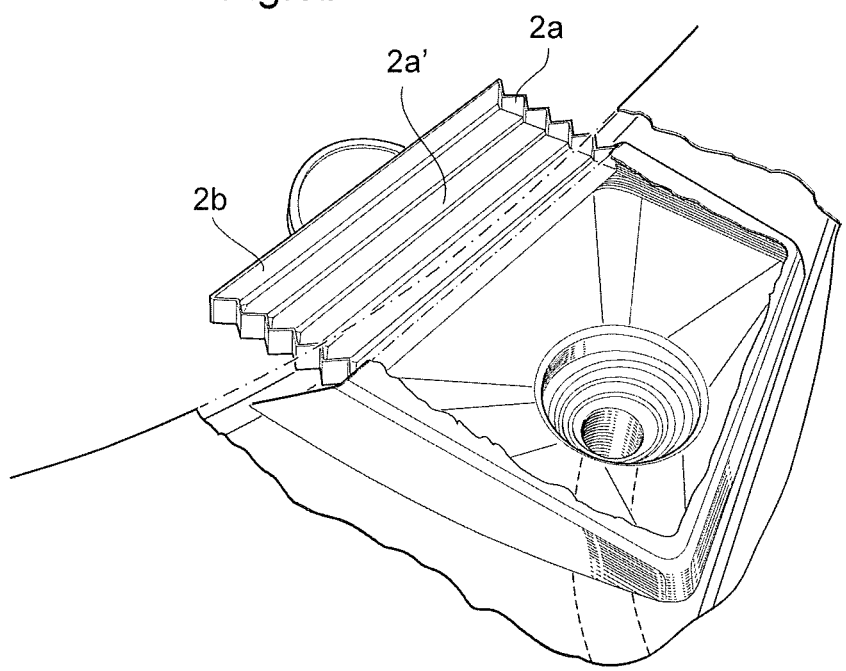

In FIGS. 5a and 5b, the fluid receiving part 2a, along with its surface 2a', is extendable from a folded position in a direction essentially straight from the fluid conveying arrangement, i.e., parallel to the fluid flow direction. The surface 2a' can be one extendable harmonica shaped surface or one elastic piece of material possible to stretch.

Again, please note that in the detailed description above any embodiment or feature of an embodiment could be combined in any way if such combination is not clearly contradictory.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle fluid filling arrangement for use with a passenger vehicle having a bonnet, the fluid filling arrangement comprising:
    a fluid receiving part; and
    a fluid conveying arrangement adapted to convey a vehicle fluid supplied on the fluid receiving part into a fluid reservoir of the passenger vehicle;
    wherein the fluid receiving part comprises a fluid receiving surface that is adapted to directly receive the supplied fluid and to direct the fluid to the fluid conveying arrangement, wherein the fluid receiving part has a first retracted position in which the fluid receiving surface is concealable, and a second extracted position that is laterally displaced from the first retracted position and in which the fluid receiving surface is at least partially visible such that supply of fluid on the fluid receiving surface is possible, and wherein the fluid filling arrangement is configured to be at least partly arranged under the bonnet of the passenger vehicle such that the fluid filling arrangement is accessible when the bonnet is fully closed.

2. The fluid filling arrangement according to claim 1 wherein the fluid receiving part comprises at least first and second fluid conveying protrusions extending from the fluid receiving surface in a direction essentially perpendicular to the fluid receiving surface.

3. The fluid filling arrangement according to claim 1 wherein the fluid receiving part comprises a closure part extending from the fluid receiving surface in a direction essentially perpendicular to the fluid receiving surface.

4. The fluid filling arrangement according to claim 1 wherein the fluid receiving part is adapted to be moved manually or automatically between the first position and the second position.

5. The fluid filling arrangement according to claim 3 wherein the closure part is arranged to be used to manually move the fluid receiving part between the first position and the second position.

6. The fluid filling arrangement according to claim 1 wherein the fluid receiving part is slidingly arranged in the fluid conveying arrangement.

7. The fluid filling arrangement according to claim 1 wherein the fluid receiving part is attached to and extendable from the fluid conveying arrangement.

8. The fluid filling arrangement according to claim 1 wherein the fluid receiving part is lockable in its first retracted position by an electronic or mechanical locking device.

9. The fluid filling arrangement according to claim 1 further comprising an illumination device.

10. The fluid filling arrangement according to claim 1 further comprising a device for monitoring fluid level.

11. The fluid filling arrangement according to claim 1 further comprising a heating arrangement.

12. The fluid filling arrangement according to claim 1 wherein the fluid receiving surface is essentially flat when the fluid receiving part is in the second extracted position.

13. The fluid filling arrangement according to claim 1 wherein, when the fluid filling arrangement is mounted on the passenger vehicle, the fluid receiving part is adapted to be movable toward a windscreen of the passenger vehicle when the fluid receiving part is moved from the first retracted position to the second extracted position.

14. An assembly for filling vehicle fluid comprising at least two of the fluid filling arrangements according to claim 1.

15. A passenger vehicle comprising the fluid filling arrangement according to claim 1 and a vehicle bonnet, wherein the fluid filling arrangement is at least partly arranged under the bonnet and is accessible when the bonnet is fully closed.

16. The passenger vehicle according to claim 15 wherein the arrangement is attached to a plenum chamber cover or to any other structural part of the passenger vehicle at least partly covered by the bonnet, and wherein the second position is a position where the fluid receiving part is arranged to partly cover or bear against a windscreen of the passenger vehicle.

17. The passenger vehicle according to claim 15 further comprising a windscreen disposed proximate the bonnet, and wherein the fluid receiving part is movable toward the windscreen when the fluid receiving part is moved from the first retracted position to the second extracted position.

18. The passenger vehicle according to claim 17 wherein the fluid receiving part is configured to partly cover the windscreen when the fluid receiving part is in the second extracted position and the bonnet is in a closed position.

19. A vehicle fluid filling arrangement for use with a passenger vehicle having a fluid reservoir, a bonnet and a windscreen, the fluid filling arrangement comprising:
    a fluid receiving part; and
    a fluid conveying arrangement adapted to convey a vehicle fluid supplied on the fluid receiving part into the fluid reservoir of the passenger vehicle;
    wherein the fluid receiving part comprises a fluid receiving surface that is adapted to directly receive the fluid and to direct the fluid to the fluid conveying arrangement, and wherein, when the fluid filling arrangement is mounted on the passenger vehicle and the bonnet is in a closed position, the fluid receiving part is adapted to be movable relative to the bonnet between a first position, in which the fluid receiving surface is positioned under the bonnet, and a second position, in which the fluid receiving surface is at least partially disposed laterally away from the bonnet such that the fluid receiving surface is at least partially uncovered to receive the fluid, and the fluid receiving part is adapted to be movable toward the windscreen of the passenger vehicle when the fluid receiving part is moved from the first position to the second position.

20. A passenger vehicle comprising:

an engine room;

a bonnet positioned over the engine room;

a windscreen disposed proximate the bonnet;

a fluid reservoir positioned in the engine room; and a fluid filling arrangement including a fluid receiving part and a fluid conveying arrangement adapted to convey a vehicle fluid supplied on the fluid receiving part into the fluid reservoir, the fluid receiving part comprising a fluid receiving surface that is adapted to directly receive the fluid and to direct the fluid to the fluid conveying arrangement, wherein, when the bonnet is in a closed position, the fluid receiving part is movable relative to the bonnet between a first position, in which the fluid receiving surface is positioned under the bonnet, and a second position, in which the fluid receiving surface is at least partially disposed laterally away from the bonnet such that the fluid receiving surface is at least partially uncovered to receive the fluid, and wherein the fluid receiving part is adapted to be movable toward the windscreen when the fluid receiving part is moved from the first position to the second position.

* * * * *